US008935403B2

(12) United States Patent
Kamuf et al.

(10) Patent No.: US 8,935,403 B2
(45) Date of Patent: Jan. 13, 2015

(54) CONTROL CIRCUIT AND METHOD FOR ALLOCATING ORTHOGONAL SEQUENCES

(75) Inventors: Matthias Kamuf, Lund (SE); Christian Bergljung, Lund (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 649 days.

(21) Appl. No.: 13/320,498

(22) PCT Filed: May 6, 2010

(86) PCT No.: PCT/EP2010/056168
§ 371 (c)(1),
(2), (4) Date: Dec. 16, 2011

(87) PCT Pub. No.: WO2010/133452
PCT Pub. Date: Nov. 25, 2010

(65) Prior Publication Data
US 2012/0096168 A1 Apr. 19, 2012

Related U.S. Application Data

(60) Provisional application No. 61/181,085, filed on May 26, 2009.

(30) Foreign Application Priority Data

May 19, 2009 (EP) ..................................... 09160629

(51) Int. Cl.
*G06F 15/173* (2006.01)
*H04B 7/216* (2006.01)
(Continued)

(52) U.S. Cl.
CPC ............... *H04L 5/0016* (2013.01); *H04J 13/18* (2013.01); *H04L 5/0053* (2013.01); *H04L 5/0058* (2013.01); *H04L 5/0062* (2013.01); *H04L 27/2601* (2013.01)
USPC .......................................... 709/226; 370/342

(58) Field of Classification Search
CPC ... H04B 1/707; H04B 1/7075; H04W 52/029; H04W 72/04; H04L 5/0007; H04L 5/026; H04J 13/00; H04J 13/48; H04J 11/00; H04J 13/18; H04J 13/004; H04J 13/0044; H04J 13/16
See application file for complete search history.

(56) References Cited

U.S. PATENT DOCUMENTS 5,751,761 A * 5/1998 Gilhousen ..................... 375/146
6,163,524 A * 12/2000 Magnusson et al. .......... 370/208
(Continued)

FOREIGN PATENT DOCUMENTS

CN 1599299 A 3/2005
CN 101217309 A 7/2008
(Continued)

OTHER PUBLICATIONS

3rd Generation Partnership Project. 3GPP TS 36.211, V8.4.0 (Sep. 2008). 3rd Generation Partnership Project; Technical Specification Group Radio Access Network; Evolved Universal Terrestrial Radio Access (E-UTRA); Physical Channels and Modulation (Release 8). Section 6.7, Sep. 2008.
(Continued)

*Primary Examiner* — Peling Shaw
(74) *Attorney, Agent, or Firm* — Coats & Bennett, PLLC

(57) ABSTRACT

A method for allocating orthogonal sequences to user equipment devices, UEs, of a group sharing a channel of a telecommunication system is disclosed. The method comprises determining which UE of the group having largest transmission resource assigned for a physical uplink shared channel, PUSCH; determining a first orthogonal sequence of the UE of the group having largest transmission resource assigned; determining a second sequence that equals a quadrature phase offset of the first orthogonal sequence; reserving said second sequence when allocating sequences to remaining UEs of the group by avoiding the second sequence as long as there are other orthogonal sequences available. A control circuitry for a network node is also disclosed.

12 Claims, 2 Drawing Sheets

(51) Int. Cl.
*H04L 5/00* (2006.01)
*H04J 13/18* (2011.01)
*H04L 27/26* (2006.01)

(56) References Cited

U.S. PATENT DOCUMENTS

| | | | |
|---|---|---|---|
| 6,218,896 B1* | 4/2001 | Becker et al. | 329/304 |
| 8,498,254 B2 | 7/2013 | Dai et al. | |
| 2005/0111425 A1 | 5/2005 | Mottier et al. | |
| 2008/0268857 A1* | 10/2008 | McCoy et al. | 455/447 |

FOREIGN PATENT DOCUMENTS

| | | |
|---|---|---|
| EP | 1511205 A1 | 3/2005 |
| WO | 2009100631 A1 | 8/2009 |

OTHER PUBLICATIONS

3rd Generation Partnership Project. "Investigation on Radio Resource Indication for PHICH in E-UTRA Downlink." 3GPP TSG RAN WG1 Meeting #52, R1-081036, Sorrento, Italy, Feb. 11-15, 2008.

3rd Generation Partnership Project. "Downlink ACK/NACK Transmit Diversity." 3GPP TSG RAN WG1 Meeting #49bis, R1-073099, Orlando, FL, USA, Jun. 25-29, 2007.

3rd Generation Partnership Project. "PHICH Channel Structure." 3GPP TSG RAN1#51, R1-074580, Jeju, Korea, Nov. 5-9, 2007.

3rd Generation Partnership Project. "PHICH Resource Allocated Scheme." 3GPP TSG-RAN WG1 #52, R1-080758, Sorrento, Italy, Feb. 11-15, 2008.

3rd Generation Partnership Project. "Remaining Issues on PHICH Indexing and PHICH to RE Mapping." 3GPP TSG RAN WG1 #52, R1-080997, Sorrento, Italy, Feb. 11-15, 2008.

* cited by examiner

CONTROL CIRCUIT AND METHOD FOR ALLOCATING ORTHOGONAL SEQUENCES

TECHNICAL FIELD

The present invention relates to a method for allocating orthogonal sequences to user equipment devices, UEs, of a group sharing a channel of a telecommunication system, and to a control circuit for a telecommunication network node arranged to allocate orthogonal sequences to user equipment devices, UEs, of a group sharing a channel.

BACKGROUND

Orthogonal sequences have been used for shared use of communication capabilities that may not be entirely divided in time or frequency. In theory, the orthogonal properties of the sequences for modulating the communication signals enable the signals to co-exist with manageable interference between the signals.

"Remaining issues on PHICH indexing and PHICH to RE mapping" issued by LG Electronics to 3GPP TSG RAN WG1 #52 discloses PHICH mapping where PHICHs are mapped in I channel first, and then remaining PHICHs are mapped in Q channel.

However, due to imperfections in hardware, synchronisation, or communication channels, interference beyond what is manageable by the design of a telecommunication system may occur. It is therefore a desire to at least alleviate such effects.

SUMMARY

The present invention is based on the understanding that two orthogonal sequences being each other's quadrature phase offset will lose some of their orthogonal properties in sense of low mutual interference. The inventors have found that transmission over a shared channel can be improved by assigning such pairs of sequences in a more structured way.

According to a first aspect, there is provided a method for allocating orthogonal sequences to user equipment devices, UEs, of a group sharing a channel of a telecommunication system. The method comprises determining which UE of the group having largest transmission resource assigned for a physical uplink shared channel, PUSCH; determining a first orthogonal sequence of the UE of the group having largest transmission resource assigned; determining a second sequence that equals a quadrature phase offset of the first orthogonal sequence; reserving said second sequence when allocating sequences to remaining UEs of the group by avoiding the second sequence as long as there are other orthogonal sequences available.

The method may further comprise allocating sequences in order of assigned transmission resources to the UEs by a) determining the UE of the remaining group having largest transmission resource assigned; b) determining a third orthogonal sequence of the UE of the remaining group having largest transmission resource assigned; c) determining a fourth orthogonal sequence that equals a quadrature phase offset of the third orthogonal sequence; d) reserving said fourth orthogonal sequence when allocating to next remaining UEs of the group by avoiding the third orthogonal sequence as there are other sequences available; and repeating steps a) to d) until sequences are allocated for all UEs of the group.

An advantage of this is an overall optimisation of performance for the group of UEs.

The method may further comprise providing a control signal indicating re-allocation of sequences based on a criterion; and re-allocating the sequences to the UEs of the group upon presence of the control signal. The criterion may be that a UE of the group having largest transmission resource assigned has changed, and/or that a predetermined time has elapsed.

An advantage of this is adaptation to actual transmission circumstances of the group, which further improves overall performance.

The channel may be a physical hybrid-automatic repeat request indicator channel, PHICH.

The assigned transmission resource may be assigned power or number of assigned resource blocks, or a combination thereof. An advantage of considering these assignments is that properties having dominating impact on performance of the system is achieved.

The allocation of orthogonal sequences may be performed by assigning a start resource block which is associated with the allocated orthogonal sequence. The resource block may be defined by a frequency index. An advantage of this is that it is an advantageous approach for certain systems using Orthogonal Frequency Division Multiplex transmission schemes, such as Third Generation Partnership Project Long Term Evolution (3GPP LTE).

According to a second aspect, there is provided a control circuit for a telecommunication network node arranged to allocate orthogonal sequences to user equipment devices, UEs, of a group sharing a channel. The control circuit comprises a monitoring circuitry arranged to determine which UE of the group having largest transmission resource assigned for a physical uplink shared channel, PUSCH, and to determine an first orthogonal sequence for the UE of the group having largest transmission resource assigned; and a sequence arbiter connected to the monitoring circuitry and arranged to determine a second orthogonal sequences being a quadrature phase offset of the first orthogonal sequence, and to reserve said second orthogonal sequence to be last to assign to other UEs of the group.

The sequence arbiter may be arranged to allocate orthogonal sequences in order of assigned transmission resource to the UEs, starting with the UE of the group having largest transmission resource assigned, and to provide a list ranking each orthogonal sequence according to assigned transmission resource of any UE having a sequence allocated that with a phase offset is the orthogonal sequence for the UE wherein sequences being the orthogonal sequence allocated to any UE of the group with a quadrature phase offset are ranked according to the assigned transmission resource of respective UE such that the higher ranked orthogonal sequences, the longer reserved upon availability of lower ranked sequences.

The monitoring circuitry is further arranged to re-identify UEs of the group having largest transmission resource assigned, and upon a change provide a control signal to the sequence arbiter. The control circuit may comprise a timer circuit arranged to periodically provide a control signal to the sequence arbiter. The sequence arbiter may be arranged to re-allocate, upon reception of the control signal, the orthogonal sequences to the UEs based on the sequence allocation to the UE of the group having largest transmission resource assigned.

The channel may be a physical hybrid-automatic repeat request indicator channel, PHICH. The assigned transmission resource may be assigned power or assigned resource blocks, or a combination thereof.

DETAILED DESCRIPTION

Figure 1:
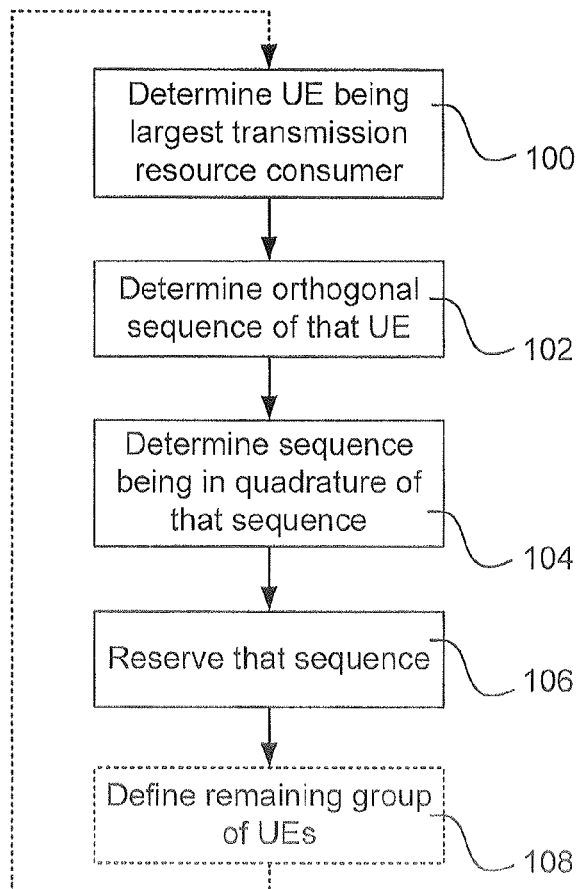
FIG. 1 is a flow chart illustrating a method according to an embodiment.

FIG. 1 is a flow chart illustrating a method for allocating orthogonal sequences to user equipment devices, UEs, according to an embodiment. The UEs form a group sharing a channel, such as a physical hybrid-automatic repeat request indicator channel, PHICH, of a telecommunication system. In a UE determining step 100, it is determined which UE of the group having largest transmission resource assigned. The largest assigned transmission resource can be counted as the one having highest assigned power, or the one having most assigned resource blocks. The transmission resource can also be an all in all judgement based on assigned power and amount of assigned resource blocks. The assigned transmission resource can be the transmission resource assigned for a physical uplink shared channel, PUSCH.

In a sequence determining step 102, a first orthogonal sequence of the UE of the group having largest transmission resource assigned is determined. Here, "determining" can be either finding an already assigned orthogonal sequence, e.g. in a communication up and running, or be assigning an orthogonal sequence, e.g. upon establishing communication.

In a quadrature sequence determining step 104, a second sequence that equals a quadrature phase offset of the first orthogonal sequence is determined. That is, if the first sequence for example is "+1, −1, +1, −1", the second sequence is "+j, −j, +j, −j", in complex number notation. Upon a phase error of the first sequence, its orthogonal properties to the second sequence will be degraded. Theoretically, if the phase error is as much as 90 degrees, the first sequence will become equal to the second sequence, and they will of course not be orthogonal anymore. However, also a small phase error will give a source of interference with any communication using the second sequence that can give a non-negligible degradation of performance.

In a sequence reserving step 106, the second sequence is reserved such that when allocating sequences to remaining UEs of the group, that second sequence is avoided as long as there are other orthogonal sequences available. Thus, the effect of any phase error as elucidated above is avoided, or at least only exposed to a UE that has less assigned transmission resources.

Optionally, the process is recursive, such that the similar process is repeated for the remaining UEs of the group, as indicated by optional remaining group definition step 108. Thus, from the remaining group, the UE having most transmission resources assigned is determined, and its orthogonal sequence. A further sequence is reserved based on the determined orthogonal sequence. A further recursion for the group remaining then can also be made, and so on. In practice, the similar effect as the recursion can be achieved by ranking transmission resource consumers, and determining/assigning orthogonal sequences based on the same principle can be made. This can be particularly advantageous for cases where more or less all available orthogonal sequences have to be used.

Figure 2:
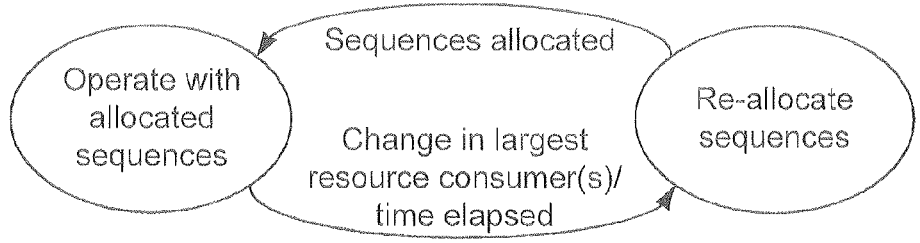
FIG. 2 is a state diagram illustrating operation and re-allocation of orthogonal sequences states according to an embodiment.

FIG. 2 is a state diagram illustrating operation and re-allocation of orthogonal sequences states according to an embodiment. Consider UEs of the group having their sequences assigned according to any of the embodiments demonstrated with reference to FIG. 1, i.e. a state transition has been made according to the leftward arrow, and operating by performing their transmissions. Thus, the state of the group is in an operation state as illustrated by the state bubble to the left. However, a mechanism for determining if a re-allocation of orthogonal sequences may improve performance can initiate a transition to a sequence re-allocation state, as illustrated by the rightward arrow and the right state bubble. The criterion for the transition can be a detected change in which UE(s) that is(are) the largest transmission resource consumer(s). This can be the case where transmission conditions have changed, or that the group has changed, i.e. new UEs have joined the group, or one or more UEs have left the group. The criterion can also be a certain time that has elapsed. In the re-allocation state, the group performs the procedure according to any of the embodiments demonstrated with reference to FIG. 1.

Figure 3:
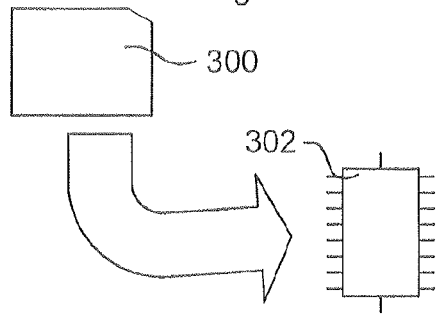
FIG. 3 schematically illustrates a computer readable medium according to an embodiment.
Figure 4:
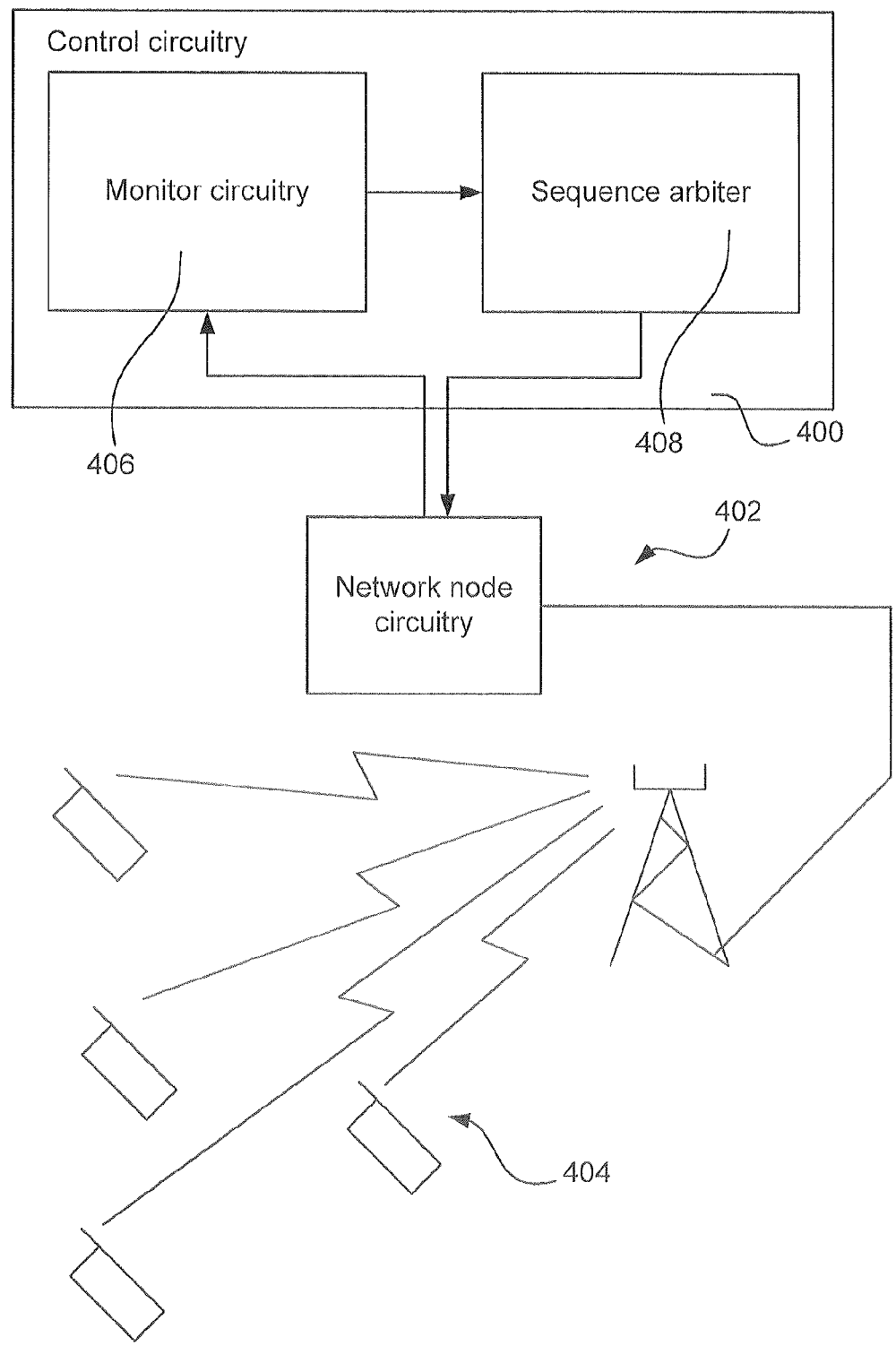
FIG. 4 schematically illustrates a block diagram of a control circuit according to an embodiment and its interaction with an exemplary part of a telecommunication network.

The method according to the present invention is suitable for implementation with aid of processing means, such as computers and/or processors. Therefore, there is provided computer programs, comprising instructions arranged to cause the processing means, processor, or computer to perform the steps of the method according to any of the embodiments described with reference to FIG. 1, in any of the apparatuses that will be described below with reference to FIG. 4. The computer programs preferably comprises program code which is stored on a computer readable medium 300, as illustrated in FIG. 3, which can be loaded and executed by a processing means, processor, or computer 302 to cause it to perform the method, respectively, according to any of the embodiments described with reference to FIG. 1. The computer 302, which preferably can be present in a network node as illustrated in FIG. 4, and computer program product 300 can be arranged to execute the program code sequentially where actions of any of the methods are performed stepwise, or be performed on a real-time basis, where actions are taken upon need and availability of needed input data. The processing means, processor, or computer 302 is preferably what normally is referred to as an embedded system. Thus, the depicted computer readable medium 300 and computer 302 in FIG. 3 should be construed to be for illustrative purposes only to provide understanding of the principle, and not to be construed as any direct illustration of the elements.

For an exemplary telecommunication system, the assignment of orthogonal sequence is based on which start block that is assigned for a transmission. Thus, the assignment of the orthogonal sequence is directly linked to the selection of start block. The start block can in turn be defined by a frequency index. Such an exemplary telecommunication system can be a system based on orthogonal frequency division multiplexing, e.g. the Third Generation Partnership Project Long Term Evolution (3GPP LTE).

FIG. 4 schematically illustrates a block diagram of a control circuit 400 according to an embodiment and its interaction with an exemplary part of a telecommunication network. The control circuit 400 is arranged to control a telecommunication network node 402 regarding allocation of orthogonal sequences to user equipment devices, UEs, 404 of a group sharing a transmission channel. Physically, the control circuit 400 can be provided in the telecommunication network node 402, or provide remote control of the node 402, e.g. from a network node controller, which may be arranged to control one or more network nodes.

The control circuit 400 comprises a monitoring circuitry 406 arranged to determine which UE of the group having largest transmission resource assigned. As elucidated above, the amount of transmission resources assigned can be in terms of assigned transmission power and/or assigned resource blocks of transmission. The particulars demonstrated above regarding feasible channels etc. are of course also feasible for the implementation of the control circuit 400. The monitor circuitry 406 is also arranged to determine a first orthogonal sequence for the UE of the group having largest transmission resource assigned. The determined information is provided to a sequence arbiter 408 connected to the monitoring circuitry 406 and arranged to determine a second orthogonal sequence being a quadrature phase offset of the first orthogonal sequence. Based on this, the sequence arbiter 408 reserves the second orthogonal sequence to be last to assign to other UEs of the group, i.e. to avoid using the second sequence if not needed, or to assign it to a small transmission resource consumer.

Thus, the sequence arbiter 408 can be arranged to allocate orthogonal sequences in order of assigned transmission resource to the UEs, starting with the UE of the group having largest transmission resource assigned, and to provide a list ranking each orthogonal sequence according to assigned transmission resource of any UE having a sequence allocated that with a phase offset is the orthogonal sequence for the UE. Orthogonal sequences being the orthogonal sequence allocated to any UE of the group with a quadrature phase offset can be ranked according to the assigned transmission resource of respective UE such that the higher ranked orthogonal sequences, the longer reserved upon availability of lower ranked sequences.

The monitoring circuitry 406 can further be arranged to re-identify circumstances of the group. For example, if the UE(s) of the group having largest transmission resource assigned is changed, the monitoring circuitry 406 provides a control signal to the sequence arbiter 408, which re-allocates one or more orthogonal sequences to adapt to the new circumstances. The control signal can also be initiated by a timer when a predetermined time has elapsed.

Based on the control, the assignments of orthogonal sequences for the transmissions of the UEs 404 are signalled from the network node 402 to the UEs.

The invention claimed is:

1. A method for allocating orthogonal sequences to user equipment devices (UEs), of a group sharing a channel of a telecommunication system, the method comprising
    determining which UE of the group has the largest transmission resource assigned for a physical uplink shared channel (PUSCH);
    determining a first orthogonal sequence of the UE of the group having the largest transmission resource assigned;
    determining a second sequence that equals a quadrature phase offset of the first orthogonal sequence; and
    reserving said second sequence when allocating sequences to remaining UEs of the group by avoiding the second sequence as long as there are other orthogonal sequences available.

2. The method of claim 1, further comprising allocating sequences in order of assigned transmission resources to the UEs by:
    a) determining which UE of the remaining UEs in the group has the largest transmission resource assigned;
    b) determining a third orthogonal sequence of the UE of the remaining UEs in the group having largest transmission resource assigned;
    c) determining a fourth orthogonal sequence that equals a quadrature phase offset of the third orthogonal sequence;
    d) reserving said fourth orthogonal sequence when allocating to next remaining UEs of the group by avoiding the third orthogonal sequence as long as there are other sequences available; and
    repeating steps a) to d) until sequences are allocated for all UEs of the group.

3. The method of claim 1 further comprising:
    providing a control signal indicating a re-allocation of sequences based on a criterion; and
    re-allocating the sequences to the UEs of the group responsive to the control signal.

4. The method of claim 3, wherein the criterion comprises a detected indication that a UE of the group having largest transmission resource assigned has changed.

5. The method of claim 3, wherein the criterion comprises a detected indication that a predetermined time has elapsed.

6. The method of claim 1, wherein the assigned transmission resource comprises an assigned power or a number of assigned resource blocks, or a combination thereof.

7. A control circuit for a telecommunication network node configured to allocate orthogonal sequences to user equipment devices (UEs), of a group sharing a channel, the control circuit comprising:
    monitoring circuitry configured to determine which UE of the group has the largest transmission resource assigned for a physical uplink shared channel (PUSCH), and to determine a first orthogonal sequence for the UE of the group having largest transmission resource assigned for the PUSCH; and
    a sequence arbiter operatively connected to the monitoring circuitry and configured to determine a second orthogonal sequences being a quadrature phase offset of the first orthogonal sequence, and to reserve said second orthogonal sequence to be last to assign to other UEs of the group.

8. The control circuit of claim 7, wherein the sequence arbiter is configured to:
    allocate orthogonal sequences in order of assigned transmission resource to the UEs, starting with the UE of the group having largest transmission resource assigned;
    provide a list ranking each orthogonal sequence according to assigned transmission resource of any UE having a sequence allocated that, with a phase offset, is the orthogonal sequence for the UE; and
    wherein sequences that are the orthogonal sequence allocated to any UE of the group with a quadrature phase offset are ranked according to the assigned transmission resource of a respective UE such that the higher ranked orthogonal sequences are reserved longer upon availability of lower ranked sequences.

9. The control circuit of claim 7 wherein the monitoring circuitry is further configured to re-identify UEs of the group having the largest transmission resource assigned, and upon detecting a change, provide a control signal to the sequence arbiter.

10. The control circuit of claim 7 further comprising a timer circuit configured to periodically provide a control signal to the sequence arbiter.

11. The control circuit of claim 9, wherein the sequence arbiter is configured to re-allocate, upon reception of the control signal, the orthogonal sequences to the UEs based on the sequence allocation to the UE of the group having the largest transmission resource assigned.

12. The control circuit of claim 7, wherein the assigned transmission resource comprises an assigned power or assigned resource blocks, or a combination thereof.

* * * * *